United States Patent
Miller (10) Patent No.: US 10,208,610 B2
(45) Date of Patent: Feb. 19, 2019

(54) RING SEAL ARRANGEMENT

(71) Applicant: UNITED TECHNOLOGIES CORPORATION, Farmington, CT (US)

(72) Inventor: Jonathan Logan Miller, Ware, MA (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 15/481,164

(22) Filed: Apr. 6, 2017

(65) Prior Publication Data

US 2018/0291756 A1    Oct. 11, 2018

(51) Int. Cl.
| | |
|---|---|
| F16J 15/44 | (2006.01) |
| F01D 11/00 | (2006.01) |
| F01D 25/16 | (2006.01) |
| F01D 25/18 | (2006.01) |
| F16J 15/34 | (2006.01) |

(52) U.S. Cl.
CPC ............ *F01D 11/003* (2013.01); *F01D 25/16* (2013.01); *F01D 25/18* (2013.01); *F01D 25/183* (2013.01); *F16J 15/3452* (2013.01); *F16J 15/441* (2013.01); *F05D 2220/32* (2013.01); *F05D 2240/55* (2013.01); *F05D 2240/60* (2013.01); *F05D 2260/52* (2013.01)

(58) Field of Classification Search
CPC ........ F01D 11/003; F01D 25/16; F01D 25/18; F05D 2220/32; F05D 2240/60; F05D 2260/52; F16J 15/34; F16J 15/3436; F16J 15/3452
See application file for complete search history.

(56) References Cited

U.S. PATENT DOCUMENTS

| | | | |
|---|---|---|---|
| 3,743,303 A | 7/1973 | Pope | |
| 4,211,424 A * | 7/1980 | Stein | F01D 11/003 277/352 |
| 4,408,765 A | 10/1983 | Adelmann, Jr. | |
| 5,518,256 A | 5/1996 | Gaffal | |
| 6,692,006 B2 | 2/2004 | Holder | |
| 8,967,627 B2 | 3/2015 | Jahn et al. | |
| 2016/0104830 A1 | 4/2016 | Fan et al. | |
| 2016/0201805 A1 | 7/2016 | Lewis | |

FOREIGN PATENT DOCUMENTS

EP    3048344    7/2016

OTHER PUBLICATIONS

European Patent Office, European Search Report dated Jul. 19, 2018 in Application No. 18163455.1-1006.

* cited by examiner

*Primary Examiner* — Gilbert Y Lee
(74) *Attorney, Agent, or Firm* — Snell & Wilmer, L.L.P.

(57) ABSTRACT

A ring seal assembly is provided. The ring seal assembly may comprise an air side ring seal and an oil side ring seal. The air side ring seal may have one or more axial and radial grooves. The oil side ring seal may also have one or more axial and radial grooves, and may have circumferential slots in fluid communication with one or more of the grooves. The oil side ring seal may have an extended leg protruding towards the air side ring seal. The extended leg and a forward outer surface of the oil side ring seal and an aft outer surface of the air side ring seal may define a spring cavity.

17 Claims, 5 Drawing Sheets

RING SEAL ARRANGEMENT

FIELD

The present disclosure relates generally to gas turbine engines, and more specifically, to ring seal arrangements for gas turbine engines.

BACKGROUND

Gas turbine engines typically include a fan section, a compressor section, a combustor section and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

SUMMARY

In various embodiments, a ring seal assembly is disclosed. The ring seal assembly may comprise a front seat coupled to a rear seat. The ring seal assembly may comprise an air side ring seal having a first forward axially outer surface opposite a first aft axially outer surface, wherein the first forward axially outer surface is configured to be in contact with the front seat. The ring seal assembly may comprise an oil side ring seal having a second forward axially outer surface opposite a second aft axially outer surface, wherein the second aft axially outer surface is configured to be in contact with the rear seat, and wherein the oil side ring seal comprises an extended leg protruding in an axial direction from the second forward axially outer surface towards the first aft axially outer surface of the air side ring seal.

In various embodiments, the air side ring seal may comprise a first radial surface groove defining an axial groove on a first radially outer surface. The air side ring seal may comprise at least one of a first forward axial surface groove defining a radial groove on the first forward axially outer surface or a first aft axial surface groove defining a radial groove on the first aft axially outer surface. The air side ring seal may comprise at least one of a first forward notch defining a circumferential groove along the first radially outer surface and the first forward axially outer surface or a first aft notch defining a circumferential groove along the first radially outer surface and the first aft axially outer surface. In various embodiments, the oil side ring seal may comprise a second radial surface groove defining an axial groove on a second radially outer surface and a radial surface circumferential slot defining a circumferential slot on the second radially outer surface, wherein the second radial surface groove is in fluid communication with the radial surface circumferential slot. The oil side ring seal may also comprise a second aft axial surface groove defining a radial groove on the second aft axially outer surface and an axial surface circumferential slot defining a circumferential slot on the second aft axially outer surface, wherein the second aft axial surface groove is in fluid communication with the axial surface circumferential slot. The oil side ring seal may also comprise a second aft notch defining a circumferential groove along the second radially outer surface and the second aft axially outer surface.

In various embodiments, a gas turbine engine is disclosed. The gas turbine engine may comprise a shaft; a front seat coupled to the shaft; an aft seat coupled to the shaft aft the front seat; a high pressure compartment in fluid communication with a bearing compartment, wherein the bearing compartment is configured to provide lubrication to the shaft; and a ring seal assembly located between the high pressure compartment and the bearing compartment, wherein the ring seal assembly is configured to seal the high pressure compartment from the bearing compartment. The ring seal assembly may comprise: an air side ring seal having a first forward axially outer surface opposite a first aft axially outer surface, wherein the first forward axially outer surface is in contact with the front seat; and an oil side ring seal having a second forward axially outer surface opposite a second aft axially outer surface, wherein the second aft axially outer surface is in contact with the rear seat, and wherein the oil side ring seal comprises an extended leg protruding in an axial direction from the second forward axially outer surface towards the first aft axially outer surface of the air side ring seal.

In various embodiments, the extended leg and second forward axially outer surface of the oil side ring seal and the first aft axially outer surface of the air side ring seal may define a spring cavity. A wave spring may be located within the spring cavity, wherein the wave spring is in contact with the first aft axially outer surface of the air side ring seal and the second forward axially outer surface of the oil side ring seal. In various embodiments, the air side ring seal may comprise at least one of a first radial surface groove defining an axial groove on a first radially outer surface, a first forward axial surface groove defining a radial groove on the first forward axially outer surface, or a first aft axial surface groove defining a radial groove on the first aft axially outer surface. In various embodiments, the oil side ring seal may comprise at least one of a second radial surface groove defining an axial groove on a second radially outer surface or a second aft axial surface groove defining a radial groove on the second aft axially outer surface. In various embodiments, the oil side ring seal may comprise at least one of a radial surface circumferential slot defining a circumferential slot on the second radially outer surface or an axial surface circumferential slot defining a circumferential slot on the second aft axially outer surface, wherein the second radial surface groove is in fluid communication with the radial surface circumferential slot, and wherein the second aft axial surface groove is in fluid communication with the axial surface circumferential slot. In various embodiments, the air side ring seal may comprise at least one of a first forward notch defining a circumferential groove along the first radially outer surface and the first forward axially outer surface or a first aft notch defining a circumferential groove along the first radially outer surface and the first aft axially outer surface, and wherein the oil side ring seal comprises a second aft notch defining a circumferential groove along the second radially outer surface and the second aft axially outer surface.

In various embodiments, a ring seal assembly is disclosed. The ring seal assembly may comprise an air side ring seal having a first forward axially outer surface opposite a first aft axially outer surface. The ring seal assembly may comprise an oil side ring seal having a second forward axially outer surface opposite a second aft axially outer surface, wherein the oil side ring seal comprises an extended leg protruding in an axial direction from the second forward axially outer surface towards the first aft axially outer surface of the air side ring seal, and wherein the extended leg and second forward axially outer surface of the oil side ring seal and the first aft axially outer surface of the air side ring seal define a spring cavity.

In various embodiments, a wave spring may be located within the spring cavity, wherein the wave spring is in contact with the first aft axially outer surface of the air side ring seal and the second forward axially outer surface of the oil side ring seal. The extended leg of the oil side ring seal and the first aft axially outer surface of the air side ring seal may define a clearance cavity. The air side ring seal may comprise at least one of a first radial surface groove defining an axial groove on a first radially outer surface, a first forward axial surface groove defining a radial groove on the first forward axially outer surface, or a first aft axial surface groove defining a radial groove on the first aft axially outer surface, and wherein the oil side ring seal comprises at least one of a second radial surface groove defining an axial groove on a second radially outer surface or a second aft axial surface groove defining a radial groove on the second aft axially outer surface. The oil side ring seal may comprise at least one of a radial surface circumferential slot defining a circumferential slot on the second radially outer surface or an axial surface circumferential slot defining a circumferential slot on the second aft axially outer surface, wherein the second radial surface groove is in fluid communication with the radial surface circumferential slot, and wherein the second aft axial surface groove is in fluid communication with the axial surface circumferential slot. The air side ring seal may comprise at least one of a first forward notch defining a circumferential groove along the first radially outer surface and the first forward axially outer surface or a first aft notch defining a circumferential groove along the first radially outer surface and the first aft axially outer surface, and wherein the oil side ring seal comprises a second aft notch defining a circumferential groove along the second radially outer surface and the second aft axially outer surface.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
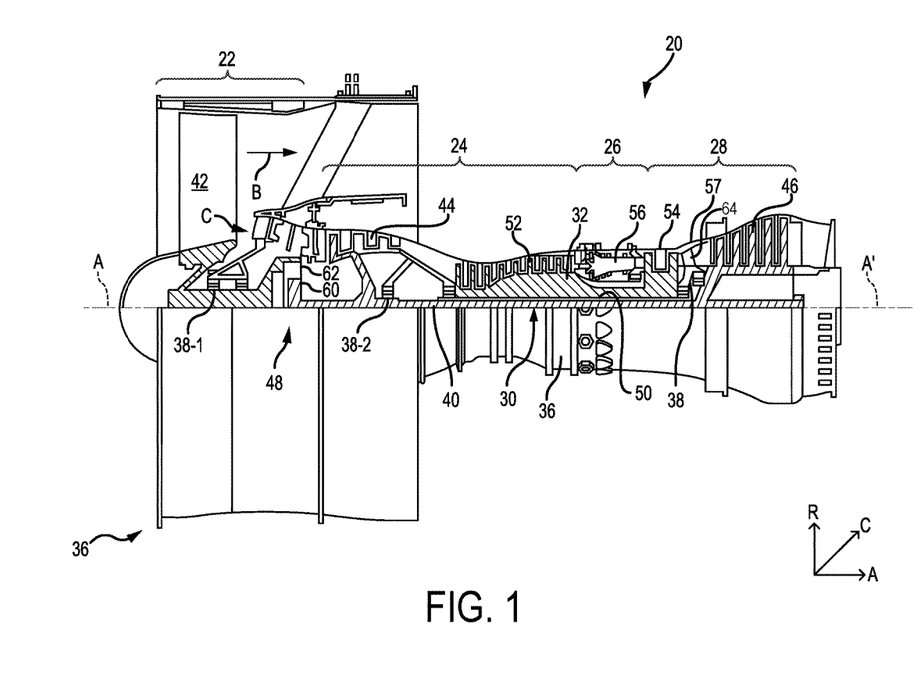
FIG. 1 illustrates an exemplary gas turbine engine, in accordance with various embodiments.

In various embodiments, and with reference to FIG. 1, a gas turbine engine 20 is disclosed. As used herein, "aft" refers to the direction associated with a tail (e.g., the back end) of an aircraft, or generally, to the direction of exhaust of gas turbine engine 20. As used herein, "forward" refers to the direction associated with a nose (e.g., the front end) of the aircraft, or generally, to the direction of flight or motion. An A-R-C axis has been included throughout the figures to illustrate the axial (A), radial (R) and circumferential (C) directions. For clarity, axial axis A spans parallel to engine central longitudinal axis A-A'. As utilized herein, radially inward refers to the negative R direction towards engine central longitudinal axis A-A', and radially outward refers to the R direction away from engine central longitudinal axis A-A'.

Gas turbine engine 20 may comprise a two-spool turbofan that generally incorporates a fan section 22, a compressor section 24, a combustor section 26, and a turbine section 28. Gas turbine engine 20 may also comprise, for example, an augmenter section, and/or any other suitable system, section, or feature. In operation, fan section 22 may drive coolant (e.g., air) along a bypass flow-path B, while compressor section 24 may further drive coolant along a core flow-path C for compression and communication into combustor section 26, before expansion through turbine section 28. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 20 may comprise a low speed spool 30 and a high speed spool 32 mounted for rotation about an engine central longitudinal axis A-A' relative to an engine static structure 36 or an engine case via one or more bearing systems 38 (shown as, for example, bearing system 38-1 and bearing system 38-2 in FIG. 1). It should be understood that various bearing systems 38 at various locations may alternatively or additionally be provided, including, for example, bearing system 38, bearing system 38-1, and/or bearing system 38-2.

In various embodiments, low speed spool 30 may comprise an inner shaft 40 that interconnects a fan 42, a low pressure (or a first) compressor section 44, and a low pressure (or a second) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 may couple inner shaft 40 to a rotating fan structure. High speed spool 32 may comprise an outer shaft 50 that interconnects a high pressure compressor ("HPC") 52 (e.g., a second compressor section) and high pressure (or a first) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and may rotate via bearing systems 38 about engine central longitudinal axis A-A'. As used herein, a "high pressure" compressor and/or turbine may experience a higher pressure than a corresponding "low pressure" compressor and/or turbine.

In various embodiments, the coolant along core airflow C may be compressed by low pressure compressor 44 and HPC 52, mixed and burned with fuel in combustor 56, and expanded over high pressure turbine 54 and low pressure turbine 46. Mid-turbine frame 57 may comprise airfoils 64 located in core airflow path C. Low pressure turbine 46 and high pressure turbine 54 may rotationally drive low speed spool 30 and high speed spool 32, respectively, in response to the expansion.

In various embodiments, gas turbine engine 20 may be, for example, a high-bypass ratio geared engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

The next generation turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which may shorten the operational life of current components.

Figure 2:
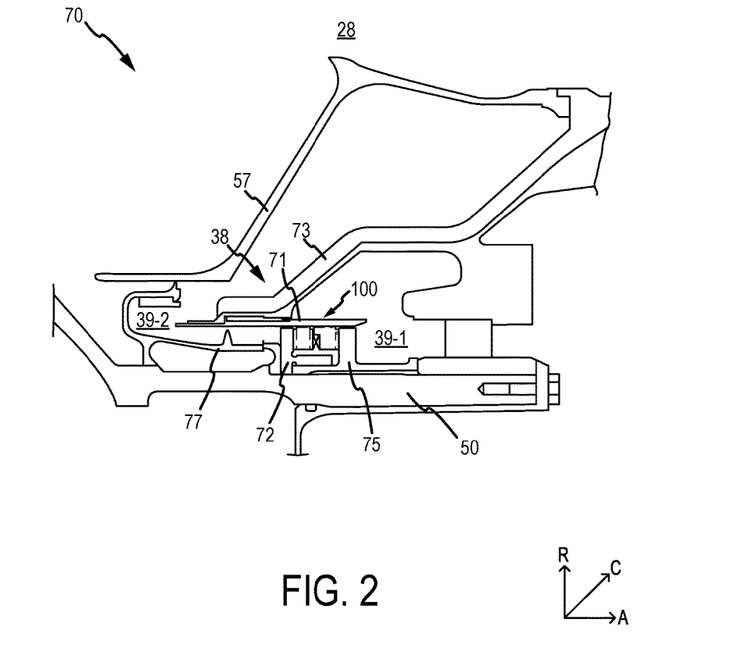
FIG. 2 illustrates a cross-sectional view of an engine section of an exemplary gas turbine engine having a ring seal arrangement, in accordance with various embodiments.

With reference now to FIG. 2 and continued reference to FIG. 1, a portion of an engine section 70 is depicted, in accordance with various embodiments. Although engine section 70 is illustrated in FIG. 2, for example, as a part of turbine section (e.g., turbine section 28), it will be understood that the seal arrangements in the present disclosure are not limited to the turbine section, and could extend to other sections of gas turbine engine 20 and to other bearing assemblies (e.g., bearing system 38, bearing system 38-1, and/or bearing system 38-2). Moreover, the present disclosure may extend to any other rotating mechanical equipment, and/or the like, wherein a high pressure fluid compartment is sealed from a low pressure fluid compartment. In various embodiments, engine section 70 may include mid-turbine frame 57 of gas turbine engine 20. Mid-turbine frame 57 may be located aft of high pressure turbine 54 and forward of low pressure turbine 46 and may be mechanically coupled to bearing system 38. Bearing system 38 may be mechanically coupled to outer shaft 50 and may supply lubrication to rotating components. Bearing system 38 may comprise a high pressure compartment 39-2 and/or a bearing compartment 39-1. High pressure compartment 39-2 may be defined by a support case 73, a static liner 71, high pressure compartment rotating structure 77, and/or a front seat 72. High pressure compartment 39-2 may comprise a high pressure fluid (e.g., air from turbine section 28). Bearing compartment 39-1 may be defined by support case 73, static liner 71, a rear seat 75, and/or outer shaft 50. Bearing compartment 39-1 may be configured to comprise a low pressure fluid (e.g., oil to lubricate rotating components). Front seat 72 may be coupled to rear seat 75 to allow bearing compartment 39-1 and high pressure compartment 39-2 to be in fluid communication via a ring seal arrangement 100. Front seat 72 and rear seat 75 may be coupled to outer shaft 50. Ring seal arrangement 100 may be configured to at least partially seal the high pressure fluid from high pressure compartment 39-2 from leaking into bearing compartment 39-1, and to at least partially seal the low pressure fluid from bearing compartment 39-1 from leaking into high pressure compartment 39-2.

Figure 3:
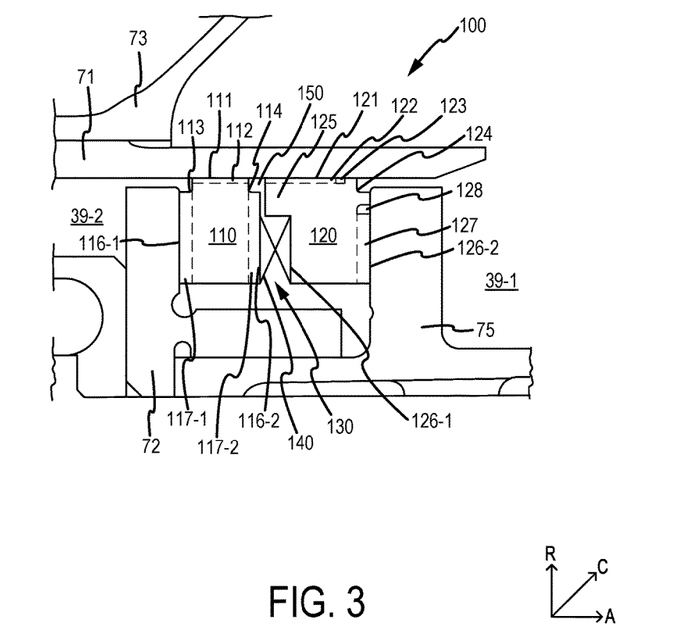
FIG. 3 illustrates a cross-sectional view of a ring seal arrangement, in accordance with various embodiments.

In various embodiments, and with reference to FIG. 3, ring seal arrangement 100 is depicted in greater detail. Ring seal arrangement 100 may comprise an air side ring seal 110 (e.g., a first ring seal or a forward ring seal) and an oil side ring seal 120 (e.g., a second ring seal or an aft ring seal). Ring seal arrangement 100 may be configured to reduce the high pressure fluid from high pressure compartment 39-2 entering into bearing compartment 39-1, and/or reduce the low pressure fluid from bearing compartment 39-1 entering into high pressure compartment 39-2. Air side ring seal 110 may be located adjacent front seat 72 and static liner 71. Oil side ring seal 120 may be located adjacent rear seat 75 and static liner 71. In that respect, air side ring seal 110 may be configured to at least partially minimize the high pressure fluid from high pressure compartment 39-2 leaking into bearing compartment 39-1, and oil side ring seal 120 may be configured to at least partially minimize the low pressure fluid from bearing compartment 39-1 leaking into high pressure compartment 39-2.

Ring seal arrangement 100 may be configured to at least partially reduce a pressure differential across air side ring seal 110 and/or at least partially reduce the resulting axial force pushing air side ring seal 110 axially away from front seat 72. By at least partially reducing the pressure differential across air side ring seal 110, ring seal arrangement 100 may also at least partially reduce a spring force sufficient for the spring 140 (and/or similar components) to ensure positive seating and/or sealing for air side ring seal 110 and oil side ring seal 120 within ring seal arrangement 100. For example, and in various embodiments, ring seal arrangement 100 may be configured to provide zero pressure differential across air side ring seal 110, thus reducing the spring force sufficient to ensure positive seating and/or sealing for air side ring seal 110 and oil side ring seal 120 within ring seal arrangement 100. In that respect, ring seal arrangement 100 may increase durability, wear resistance, performance, and/or reliability in air side ring seal 110 and oil side ring seal 120. Ring seal arrangement 100 may also delay and/or at least partially prevent seal failure in ring seal arrangement 100 during engine operation.

In various embodiments, air side ring seal 110 and oil side ring seal 120 may each comprise an annular shape. Air side ring seal 110 and/or oil side ring seal 120 may comprise a single continuous circumferential ring forming each respective annular shape. In various embodiments, air side ring seal 110 and/or oil side ring seal 120 may also comprise one or more segments coupled together end to end to form each respective annular shape. Air side ring seal 110 and/or oil side ring seal 120 may comprise suitable circumferential ring seal, and may also comprise any suitable material capable of providing sealing between two pressurized compartments, such as, for example, carbon, rubber, carbon graphite, and/or the like.

Figure 4A:
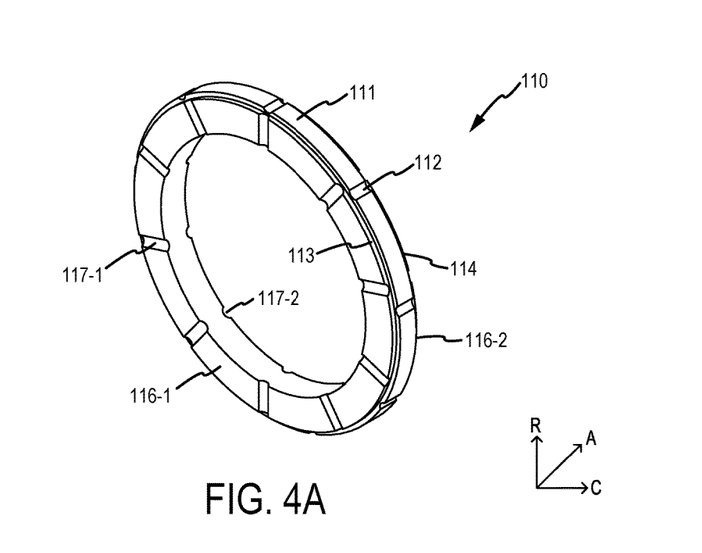
FIG. 4A illustrates a perspective view of an air side ring seal for a ring seal arrangement, in accordance with various embodiments.

In various embodiments, and with reference to FIGS. 3 and 4A, air side ring seal 110 may comprise a first radially outer surface 111 configured to contact static liner 71 to at least partially provide sealing against static liner 71. Air side ring seal 110 may also comprise a first forward axially outer surface 116-1 opposite a first aft axially outer surface 116-2. First forward axially outer surface 116-1 may be configured to contact front seat 72 and at least partially providing sealing against front seat 72. First aft axially outer surface 116-2 may be configured to interface with a second forward axially outer surface 126-1 of oil side ring seal 120, as discussed further herein.

In various embodiments, air side ring seal 110 may comprise various bleed grooves and/or slots configured to relieve and/or balance pressure from high pressure compartment 39 against air side ring seal 110 (e.g., by allowing high pressure fluid or air to leak into each bleed groove or slot). For example, air side ring seal 110 may comprise one or more first radial surface grooves 112. In that regard, air side ring seal 110 may comprise any suitable and/or desired number of first radial surface grooves 112. Each first radial surface groove 112 may define a groove along the axial axis A on first radially outer surface 111. First radial surface grooves 112 may be dispersed circumferentially around first radially outer surface 111 at any suitable distance. As a further example, and in various embodiments, air side ring seal 110 may also comprise one or more first forward axial surface grooves 117-1 and/or one or more first aft axial surface grooves 117-2. In that regard, air side ring seal 110 may comprise any suitable and/or desired number of first forward axial surface grooves 117-1 and/or first aft axial surface grooves 117-2. Each first forward axial surface grooves 117-1 may define a groove along the radial axis R on first forward axially outer surface 116-1. First forward axial surface grooves 117-1 may be dispersed circumferentially around first forward axially outer surface 116-1 at any suitable distance. Each first aft axial surface grooves 117-2 may define a groove along the radial axis R on first aft axially outer surface 116-2. First aft axial surface grooves 117-2 may be dispersed circumferentially around first aft axially outer surface 116-2 at any suitable distance. In various embodiments, first forward axial surface grooves 117-1 and/or first aft axial surface grooves 117-2 may be aligned with first radial surface groove 112. In various embodiments, first forward axial surface grooves 117-1 and/or first aft axial surface grooves 117-2 may be misaligned (e.g., offset) with first radial surface groove 112.

In various embodiments, air side ring seal 110 may comprise a first forward notch 113. First forward notch 113 may define a circumferential groove along first radially outer surface 111 and first forward axially outer surface 116-1 of air side ring seal 110. First forward notch 113 may be configured to allow for uniform wear on air side ring seal 110 during engine operation. In various embodiments, air side ring seal 110 may also comprise a first aft notch 114. First aft notch 114 may define a circumferential groove along first radially outer surface 111 and first aft axially outer surface 116-2 of air side ring seal 110. First aft notch 114 may be similar to first forward notch 113 and may comprise similar physical dimensions. First aft notch 114 may enable air side ring seal 110 to be symmetrically shaped. A symmetrical shape may aide in installation of air side ring seal 110. First aft notch 114 may also be configured to at least partially aid in allowing for uniform wear on air side ring seal 110 during engine operation.

Figure 4B:
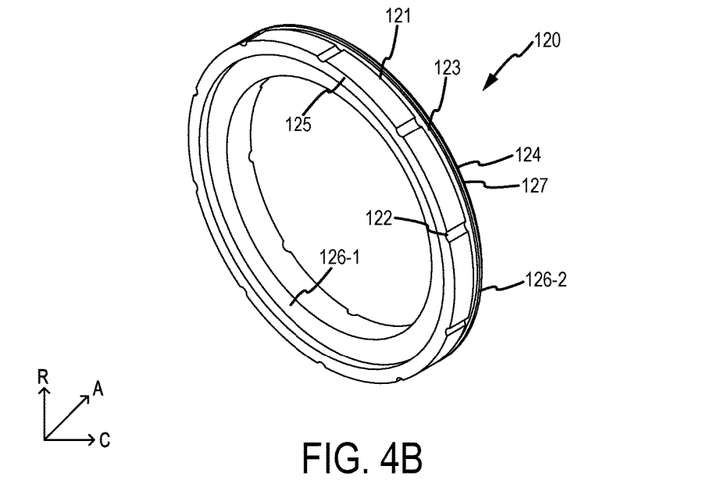
FIG. 4B illustrates a forward perspective view of an oil side ring seal for a ring seal arrangement, in accordance with various embodiments.
Figure 4C:
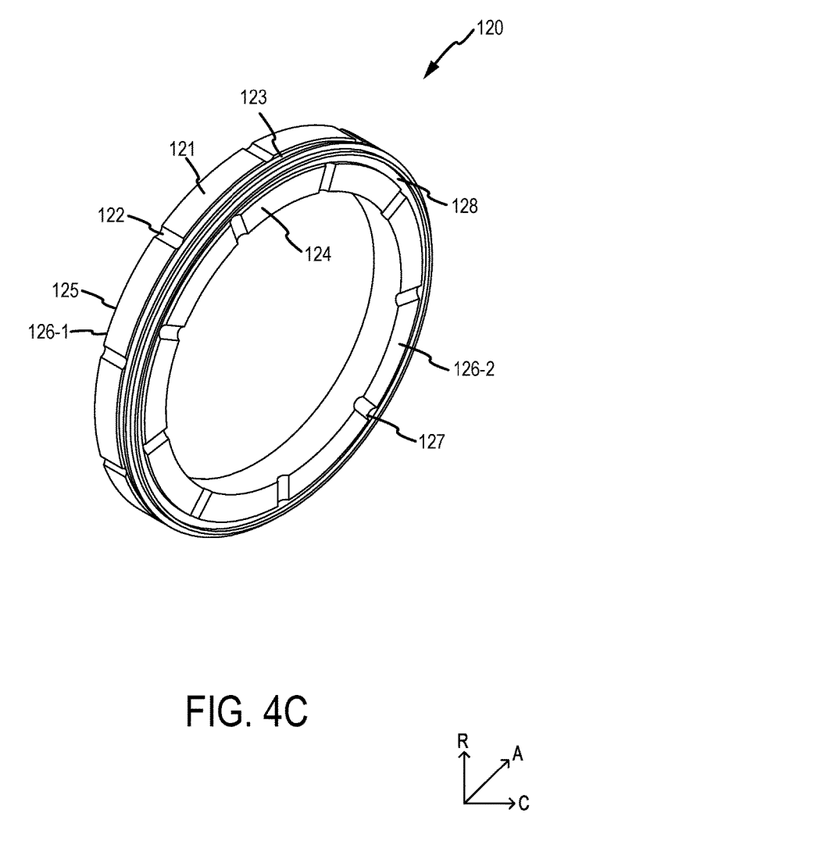
FIG. 4C illustrates an aft perspective view of the oil side ring seal for the ring seal arrangement, in accordance with various embodiments.

In various embodiments, and with reference to FIGS. 3, 4B, and 4C, oil side ring seal 120 may comprise a second radially outer surface 121 configured to contact static liner 71 to at least partially provide sealing against static liner 71. Oil side ring seal 120 may also comprise a second forward axially outer surface 126-1 opposite a second aft axially outer surface 126-2. Second forward axially outer surface 126-1 may be configured to interface with first aft axially outer surface 116-2 of air side ring seal 110, as discussed further herein. Second aft axially outer surface 126-2 may be configured to contact rear seat 75 and at least partially providing sealing against rear seat 75.

In various embodiments, oil side ring seal 120 may comprise various bleed grooves and/or slots configured to relieve and/or balance pressure between oil side ring seal 120 and air side ring seal 110 (e.g., by allowing high pressure fluid or air to leak into each bleed groove and/or slot). For example, oil side ring seal 120 may comprise one or more second radial surface grooves 122. In that regard, oil side ring seal 120 may comprise any suitable and/or desired number of second radial surface grooves 122. Each second radial surface groove 122 may define a groove along the A-axis on second radially outer surface 121. Second radial surface grooves 122 may be dispersed circumferentially around second radially outer surface 121 at any suitable distance. In various embodiments, oil side ring seal 120 may also comprise a radial surface circumferential slot 123. Radial surface circumferential slot 123 may define a continuous circumferential slot along the C-axis on second radially outer surface 121. Radial surface circumferential slot 123 may be located forward of second aft notch 124 and may be in fluid communication with second radial surface grooves 122 (e.g., fluid may flow through each second radial surface groove 122 and into radial surface circumferential slot 123).

As a further example, and in various embodiments, oil side ring seal 120 may also comprise one or more second aft axial surface grooves 127. In that regard, oil side ring seal 120 may comprise any suitable and/or desired number of second aft axial surface grooves 127. Each second aft axial surface grooves 127 may define a groove along the R-axis on second aft axially outer surface 126-2. Second aft axial surface grooves 127 may be dispersed circumferentially around second aft axially outer surface 126-2 at any suitable distance. In various embodiments, second aft axial surface grooves 127 may be aligned with second radial surface groove 122. In various embodiments, second aft axial surface grooves 127 may be misaligned (e.g., offset) with second radial surface groove 122. In various embodiments, oil side ring seal 120 may also comprise an axial surface circumferential slot 128. Axial surface circumferential slot 128 may define a continuous circumferential slot along the C-axis on second aft axially outer surface 126-2. Axial surface circumferential slot 128 may be located radially inward from second aft notch 124 and may be in fluid communication with second aft axial surface grooves 127 (e.g., fluid may flow through each second aft axial surface grooves 127 and into axial surface circumferential slot 128).

In various embodiments, oil side ring seal 120 may comprise a second aft notch 124. Second aft notch 124 may define a circumferential slot along second radially outer surface 121 and second aft axially outer surface 126-2 of oil side ring seal 120. Second aft notch 124 may be configured to allow for uniform wear on oil side ring seal 120 during engine operation.

In various embodiments, oil side ring seal 120 may comprise an extended leg 125. Extended leg 125 may protrude from second forward axially outer surface 126-1 of oil side ring seal 120 in an axial direction towards air side ring seal 110. Extended leg 125 may be configured to ensure proper seating of oil side ring seal 120 and air side ring seal 110 in ring seal arrangement 100. In various embodiments, extended leg 125 and first aft axially outer surface 116-2 of air side ring seal 110 may define a clearance cavity 150. Clearance cavity 150 may define a gap between extended leg 125 and first aft axially outer surface 116-2 of air side ring seal 110, and may be configured to provide clearance to allow air side ring seal 110 and oil side ring seal 120 to move independently, expand and/or contract during operation, and/or for ease of installation.

In various embodiments, and with reference again to FIG. 3, extended leg 125 and second forward axially outer surface 126-1 of oil side ring seal 120 and first aft axially outer surface 116-2 of air side ring seal 110 may define a spring cavity 130. Spring cavity 130 may define a gap between extended leg 125 and second forward axially outer surface 126-1 of oil side ring seal 120 and first aft axially outer surface 116-2 of air side ring seal 110, and may be configured to receive a spring 140, and/or any other suitable pressure balancing component. Spring 140 may be configured to provide an axial spring force against air side ring seal 110 and oil side ring seal 120 to ensure proper seating of air side ring seal 110 against front seat 72 and oil side ring seal 120 against rear seat 75. In that respect, spring 140 may comprise any suitable spring and/or similar component capable of providing spring force against air side ring seal 110 and oil side ring seal 120. For example, spring 140 may comprise one or more wave springs, coil springs, and/or the like. In various embodiments, one or more washers may also be inserted along the axial sides of spring 140 in spring cavity 130 to reduce component wear against air side ring seal 110 and oil side ring seal 120 caused by spring 140 rubbing against the axial surfaces.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A ring seal assembly, comprising:
a front seat coupled to a rear seat;
an air side ring seal, comprising:
a first forward axially outer surface opposite a first aft axially outer surface, wherein the first forward axially outer surface is configured to be in contact with the front seat;
a first radial surface groove defining an axial groove on a first radially outer surface of the air side ring seal;
a first forward axial surface groove defining a radial groove on the first forward axially outer surface, wherein the first forward axial surface groove is in fluid communication with the first radial surface groove; and
a first aft axial surface groove defining a radial groove on the first aft axially outer surface, wherein the first aft axial surface groove is in fluid communication with the first radial surface groove; and
an oil side ring seal, comprising:
a second forward axially outer surface opposite a second aft axially outer surface, wherein the second aft axially outer surface is configured to be in contact with the rear seat; and
an extended leg protruding from the second forward axially outer surface proximate an oil side radially outer surface in an axial direction towards the first aft axially outer surface of the air side ring seal, wherein the extended leg, the first aft axially outer surface of the air side ring seal, and the second forward axially outer surface of the oil side ring seal define a spring cavity.

2. The ring seal assembly of claim 1, wherein the air side ring seal comprises a first forward notch defining a circumferential groove along the first radially outer surface and the first forward axially outer surface.

3. The ring seal assembly of claim 1, wherein the air side ring seal comprises a first aft notch defining a circumferential groove along the first radially outer surface and the first aft axially outer surface.

4. The ring seal assembly of claim 1, wherein the oil side ring seal comprises a second radial surface groove defining an axial groove on the oil side radially outer surface and a radial surface circumferential slot defining a circumferential slot on the oil side radially outer surface, wherein the second radial surface groove is in fluid communication with the radial surface circumferential slot.

5. The ring seal assembly of claim 1, wherein the oil side ring seal comprises a second aft axial surface groove defining a radial groove on the second aft axially outer surface and an axial surface circumferential slot defining a circumferential slot on the second aft axially outer surface, wherein the second aft axial surface groove is in fluid communication with the axial surface circumferential slot.

6. The ring seal assembly of claim 1, wherein the oil side ring seal comprises a second aft notch defining a circumferential groove along the oil side radially outer surface and the second aft axially outer surface.

7. A gas turbine engine, comprising:
a shaft;
a front seat coupled to the shaft;
an aft seat coupled to the shaft aft the front seat;
a high pressure compartment in fluid communication with a bearing compartment, wherein the bearing compartment is configured to provide lubrication to the shaft; and
a ring seal assembly located between the high pressure compartment and the bearing compartment, wherein the ring seal assembly is configured to seal the high pressure compartment from the bearing compartment, the ring seal assembly comprising:
an air side ring seal, comprising:
a first forward axially outer surface opposite a first aft axially outer surface, wherein the first forward axially outer surface is configured to be in contact with the front seat;
a first radial surface groove defining an axial groove on a first radially outer surface of the air side ring seal;
a first forward axial surface groove defining a first radial groove on the first forward axially outer surface, wherein the first forward axial surface groove is in fluid communication with the first radial surface groove; and
a first aft axial surface groove defining a second radial groove on the first aft axially outer surface, wherein the first aft axial surface groove is in fluid communication with the first radial surface groove; and
an oil side ring seal, comprising:
a second forward axially outer surface opposite a second aft axially outer surface, wherein the second aft axially outer surface is configured to be in contact with the rear seat; and
an extended leg protruding from the second forward axially outer surface proximate an oil side radially outer surface in an axial direction towards the first aft axially outer surface of the air side ring seal, wherein the extended leg, the first aft axially outer surface of the air side ring seal, and the second forward axially outer surface of the oil side ring seal define a spring cavity.

8. The gas turbine engine of claim 7, further comprising a wave spring located within the spring cavity, wherein the wave spring is in contact with the first aft axially outer surface of the air side ring seal and the second forward axially outer surface of the oil side ring seal.

9. The gas turbine engine of claim 7, wherein the oil side ring seal comprises at least one of a second radial surface groove defining an axial groove on the oil side radially outer surface or a second aft axial surface groove defining a radial groove on the oil side aft axially outer surface.

10. The gas turbine engine of claim 9, wherein the oil side ring seal comprises at least one of a radial surface circumferential slot defining a circumferential slot on the oil side radially outer surface or an axial surface circumferential slot defining a circumferential slot on the second aft axially outer surface, wherein the second radial surface groove is in fluid communication with the radial surface circumferential slot, and wherein the second aft axial surface groove is in fluid communication with the axial surface circumferential slot.

11. The gas turbine engine of claim 7, wherein the air side ring seal comprises at least one of a first forward notch defining a circumferential groove along the first radially outer surface and the first forward axially outer surface or a first aft notch defining a circumferential groove along the first radially outer surface and the first aft axially outer surface, and wherein the oil side ring seal comprises a second aft notch defining a circumferential groove along the oil side radially outer surface and the second aft axially outer surface.

12. A ring seal assembly, comprising:
an air side ring seal, comprising:
a first forward axially outer surface opposite a first aft axially outer surface;
a first radial surface groove defining an axial groove on a first radially outer surface of the air side ring seal;
a first forward axial surface groove defining a first radial groove on the first forward axially outer surface, wherein the first forward axial surface groove is in fluid communication with the first radial surface groove; and a first aft axial surface groove defining a second radial groove on the first aft axially outer surface, wherein the first aft axial surface groove is in fluid communication with the first radial surface groove; and an oil side ring seal, comprising:

a second forward axially outer surface opposite a second aft axially outer surface;

an extended leg protruding from the second forward axially outer surface proximate an oil side radially outer surface in an axial direction towards the first aft axially outer surface of the air side ring seal, wherein the extended leg, the second forward axially outer surface of the oil side ring seal, and the first aft axially outer surface of the air side ring seal define a spring cavity.

13. The ring seal assembly of claim 12, further comprising a wave spring located within the spring cavity, wherein the wave spring is in contact with the first aft axially outer surface of the air side ring seal and the second forward axially outer surface of the oil side ring seal.

14. The ring seal assembly of claim 12, wherein the extended leg of the oil side ring seal and the first aft axially outer surface of the air side ring seal define a clearance cavity.

15. The ring seal assembly of claim 12, wherein the oil side ring seal comprises at least one of a second radial surface groove defining an axial groove on the oil side radially outer surface or a second aft axial surface groove defining a radial groove on the second aft axially outer surface.

16. The ring seal assembly of claim 15, wherein the oil side ring seal comprises at least one of a radial surface circumferential slot defining a circumferential slot on the oil side radially outer surface or an axial surface circumferential slot defining a circumferential slot on the second aft axially outer surface, wherein the second radial surface groove is in fluid communication with the radial surface circumferential slot, and wherein the second aft axial surface groove is in fluid communication with the axial surface circumferential slot.

17. The ring seal assembly of claim 12, wherein the air side ring seal comprises at least one of a first forward notch defining a circumferential groove along the first radially outer surface and the first forward axially outer surface or a first aft notch defining a circumferential groove along the first radially outer surface and the first aft axially outer surface, and wherein the oil side ring seal comprises a second aft notch defining a circumferential groove along the oil side radially outer surface and the second aft axially outer surface.

* * * * *